United States Patent [19]

Johansson et al.

[11] Patent Number: 4,631,359
[45] Date of Patent: Dec. 23, 1986

[54] ARRANGEMENT FOR SUPPLYING CURRENT TO A SUBSCRIBER TELEPHONE SET

[75] Inventors: Jan H. Johansson, Bålsta; Nils J. Sundvall, Lidingö, both of Sweden

[73] Assignee: Telefonaktiebolaget LM Ericsson, Stockholm, Sweden

[21] Appl. No.: 610,291

[22] PCT Filed: Sep. 22, 1983

[86] PCT No.: PCT/SE83/00333

§ 371 Date: May 4, 1984

§ 102(e) Date: May 4, 1984

[87] PCT Pub. No.: WO84/01250

PCT Pub. Date: Mar. 29, 1984

[30] Foreign Application Priority Data

Sep. 22, 1982 [SE] Sweden .................... 8205437

[51] Int. Cl.$^4$ ........................... H04M 19/00
[52] U.S. Cl. ........................... 379/324; 379/413
[58] Field of Search ............... 179/70, 77, 170 NC, 179/170 G, 16 F, 16 AA

[56] References Cited

U.S. PATENT DOCUMENTS 4,315,207 2/1982 Apfel ..................... 323/284
4,345,117 8/1982 Sweet ..................... 179/77
4,431,869 2/1984 Sweet ..................... 179/77
4,465,967 8/1984 Tokunaga et al. ........ 323/285
4,476,350 10/1984 Aull et al. ................ 179/70

Primary Examiner—Gene Z. Rubinson
Assistant Examiner—R. Vaas
Attorney, Agent, or Firm—Roberts, Spiecens & Cohen

[57] ABSTRACT

An apparatus for supplying current to a subscriber telephone set ($R_L$) connected to a telephone exchange via a two-wire line departing from a a-wire and a b-wire output terminal in the arrangement. The arrangement includes two analogue amplifiers (2, 3) each with its output connected to said respective a-wire and b-wire output terminal, through which the combined DC-current and current representing the speech signal are fed out to the line. The apparatus further includes a voltage source with the pole voltage ($E_B$) and its poles connected to two voltage supply inputs on each amplifier (2, 3), the output of the first amplifier (2, 3) being kept at a fixed potential. Three signal sources (5, 6, 8) are connected to the inputs of the amplifiers, the respective signal contribution of these sources being added for controlling the output magnitudes of the amplifiers. A first signal source (6) constitutes the reference signal source and has a fixed signal contribution. A second signal source (5) is controlled by the output magnitudes of the amplifiers, and a third signal source (8) is controlled by the difference between the transversal line voltage and the actual voltage ($E_B$).

6 Claims, 8 Drawing Figures

ARRANGEMENT FOR SUPPLYING CURRENT TO A SUBSCRIBER TELEPHONE SET

TECHNICAL FIELD

The present invention relates to an apparatus in the current supply of a subscriber's telephone set from a telephone exchange.

BACKGROUND ART

In telephone installations the subscriber sets are connected to the exchange by so-called subscriber lines, which are terminated in the exchange at an adaption circuit, or subscriber line interface circuit (SLIC). Such a circuit is used, inter alia, to supply DC current to the associated subscriber apparatus.

A fixed DC voltage may be utilized for this current supply in the prior art. In such a case, the current flowing through the subscriber line will be a function of the internal resistance of the subscriber apparatus or station, and of course the line length. The internal resistance in the apparatus can be kept within narrow limits, but the line length and line resistance may vary considerably. If a fixed DC voltage is used, this must be given a value such that sufficient current can be fed out on long lines as well.

In modern line circuits, the supply impedances are often simulated with the aid of feed-back amplifiers. The physical supply resistances are low-ohmic and the power generation in the resistance is low. In order to reduce the power generation in the output step of the amplifier as well, it is known to utilize controllable DC/DC converters, e.g. so-called choppers, instead of batteries in the voltage supply.

Two principles are described in the literature for the impedance simulation, c.f. Proceedings Of the IEEE, Vol. 68, No. 8, August 1980, pages 991–1009, for example. According to one principle, the line current is sensed to form an instant value in a control system controlling the line voltage. This method gives simple conditions for operating point setting of the participating amplifiers and control of DC/DC converters. However, the method has the considerable disadvantage that the amplifier which has floatingly to sense the line current out on the line will be difficult to achieve with sufficient precision.

According to the other method, the line voltage is sensed and the control system controls the line current. This method gives more simple conditions for realizing the sensing amplifier, but on the other hand it gives difficulties in setting the operating points of the amplifiers and control of DC/DC converters.

In electronic subscriber line circuits according to the above, the amplifiers require a supply voltage for their function which exceeds by a given amount the transversal line voltage, i.e. the voltage between the outputs of the amplifiers. If this condition is not met, there is the risk of the signal voltage being clipped. This relationship defines the maximum length of a line which can be connected to the line circuit without risk of transmission degeneration. Consideration must also be taken here of the fact that the battery voltage can vary considerably, depending on the state of charge, load etc.

DISCLOSURE OF INVENTION

In the present invention, the line-feeding two-pole is implemented with the aid of two analogue amplifiers, through which the combined DC current and current representing the speech signal are fed out on to the line. The DC line feed voltage, as with the internal voltage supply to such amplifier, is taken from a chopper or a battery. The inventive principle is, however, also applicable to systems utilizing two choppers per line. It is also applicable to the arrangement where the mean potential at one output terminal of the subscriber line circuit is kept at a constant level by a control system, not illustrated here.

The technical problem which is solved by the present invention resides in preventing the amplifiers from becoming saturated and thus clipping the signal voltage, even if a very long line were to be connected to the line circuit and the battery voltage vary.

An advantage of the invention is that the available battery voltage is optimally utilized at every instant. The telephone system thus functions in a desired manner for an optimum line length interval and for line lengths exceeding this interval the system still functions, although not as well from the quality aspect.

BRIEF DESCRIPTION OF DRAWINGS

The invention will now be described in detail with reference to the accompanying drawing, whereon

BEST MODES FOR CARRYING OUT THE INVENTION

The principle of the invention will be illustrated below, as applied to a subscriber line circuit, for which the voltage supply to the line circuit is represented by the symbol for a fixed DC voltage. In this connection, however, the symbol must also stand for system solutions with one or two DC/DC converters connected in series with the source of supply.

Figure 1:
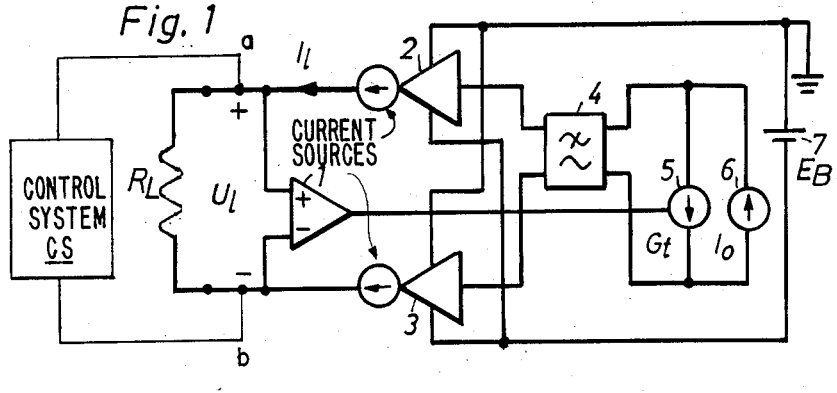
FIG. 1 illustrates an electronic subscriber line circuit with voltage sensing and current supply.

FIG. 1 illustrates an electronic subscriber line circuit with voltage sensing and current supply. A condition for the continued discussion here is that that the point A in the figure, i.e. the a-terminal of the subscriber line circuit, is given a fixed means potential with the aid of a control system CS. This system can be implemented as will be apparent from the Swedish patent application SE No. 82.04185-6 corresponding to U.S. patent application Ser. No. 06/598,322, filed Mar. 6, 1984.

Via its a and b terminals, the subscriber line circuit supplies a load, e.g. in the form of a telephone set with line, symbolized here by a resistor with resistance $R_L$. Each terminal is connected to the output of an analogue amplifier 2,3, which is coupled as a current source with the current gain factor $A_i$. Via its final stage, each of these amplifiers can drive positive or negative current via on the line to the load from an earth-connected voltage terminal on the amplifier, and a voltage terminal connected to the minus pole on a plus-earthed voltage source 7 with the voltage $E_B$. The output current from the amplifiers 2,3 is controlled via their inputs, to which two current generators 5,6 are connected via a lowpass filter 4. The current generator 6 is a fixed reference current source, supplying the current $I_o$, while the generator 5 is a voltage-controlled current source with the transconductance $G_t$. A differential amplifier 1 is arranged to sense the transversal line voltage $U_1$, and via its output to control the current generator 5. The following is applicable for the line current $I_1$:

$$I_1 = A_i(I_o - U_1 \cdot G_t).$$

Figure 2:
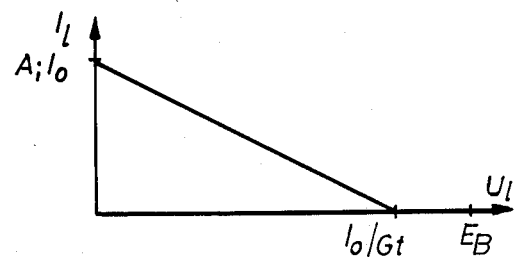
FIG. 2 illustrates the current-voltage characteristic for the circuit according to FIG. 1.

FIG. 2 illustrates $I_1$ as a function of $U_1$. It will be seen that the subscriber line circuit simulates a resistive supply with a battery voltage equal to $I_o/G_t$ and a supply resistance equal to $1/A_iG_t$. When the transconductance $G_t$ is equal to zero there is obtained constant current supply and a horizontal characteristic. If the voltage $E_B$ were to drop, for reasons described above, there may be problems concerned with clipping the signal voltage for long lines, i.e. for low line current $I_1$.

Figure 3:
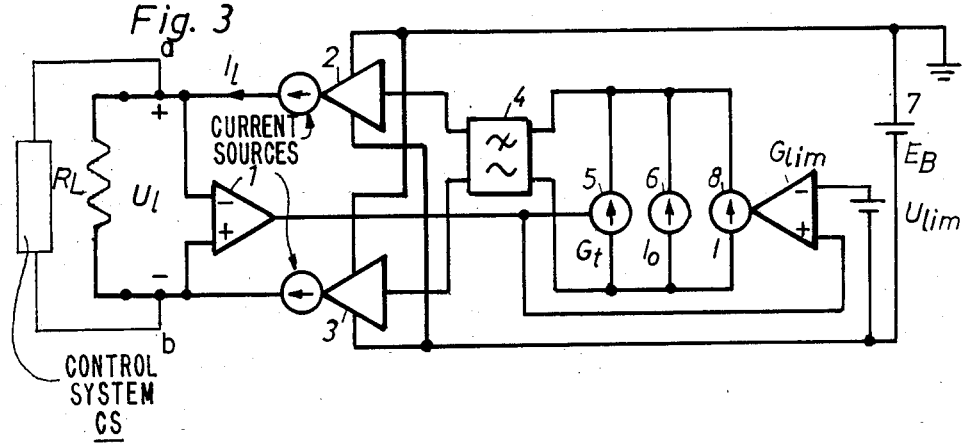
FIG. 3 illustrates an embodiment of the invention.

FIG. 3 illustrates an embodiment of the invention: A non-linear comparator 8 with a current output is arranged parallel to the current sources 5,6 and drives current in the same direction as the source 5. The comparator has two inputs. One input is supplied the voltage $-U_1$ and the other a voltage $-E_B + U_{lim}$ is an internal voltage reference in the comparator, here depicted as an external voltage source. The comparator is such that for $$-U_1 < -E_B + U_{lim}$$

its output current will be $$I = -G_{lim}(U_1 - E_B + U_{lim})$$

where $G_{lim}$ is the transconductance for the comparator. The output current is equal to zero for remaining values of the voltage $U_1$.

Analogously with the preceding there thus obtained for $$U_1 > E_B - U_{lim}$$

$$I_1 = A_i(I_o - U_1 \cdot G_t - (U_1 - E_B + U_{lim})G_{lim})$$

Figure 4:
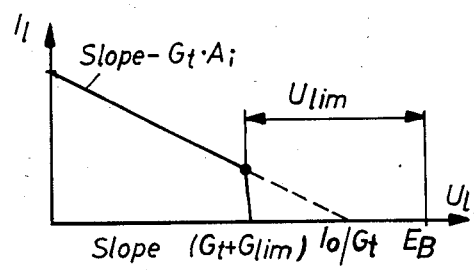
FIG. 4 illustrates the current-voltage characteristic for the circuit according to FIG. 3.

This function is illustrated graphically in FIG. 4. The characteristic has a break point which is at a distance $U_{lim}$ from the battery voltage $E_B$, thus following the variations of the battery voltage. The control system, which keeps the potential on the a-terminal constant, is dimensioned such that this potential will be equal to $-U_{lim}/2$, and furthermore, if the voltage $U_{lim}$ is put equal to the voltage with which the actual battery voltage must exceed the actual transverse voltage supplemented by the slope of the characteristic for ensuring that the amplifiers do not become saturated, the above-mentioned problem is avoided.

The inventive principle, which has been illustrated here on an unsymmetric system, may also be realized in a system with a symmetric supply.

Figure 5:
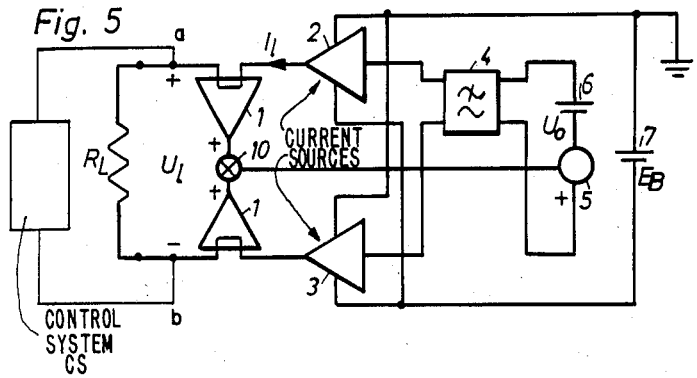
FIG. 5 illustrates an electronic subscriber line circuit with current sensing and voltage supply.

An electronic subscriber line circuit with current sensing and voltage supply is illustrated in FIG. 5. In the dual method, the output current is thus sensed from the circuit by a combination of two transconductance amplifiers 1 and an adding circuit 10. The transfer impedances for the amplifiers 1 is equal to $R_t$. In this case the analogue amplifiers are two voltage amplifiers with the gain factor $A_v$. These amplifiers are supplied on the input side by two series-connected voltage sources, a fixed reference voltage source with the voltage $U_o$ and a voltage source controlled by the output current from the circuit. The output voltage from the voltage source 5 is equal to $I_1 \cdot R_t$. The following is applicable for these conditions:

$$I_1 = -\frac{1}{A_v R_t} \cdot U_1 + \frac{U_0}{R_t}$$

Figure 6:
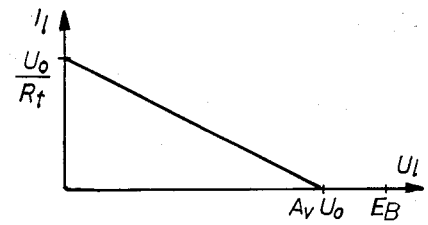
FIG. 6 illustrates the current-voltage characteristic for the circuit according to FIG. 5.

FIG. 6 illustrates this relationship graphically.

Figure 7:
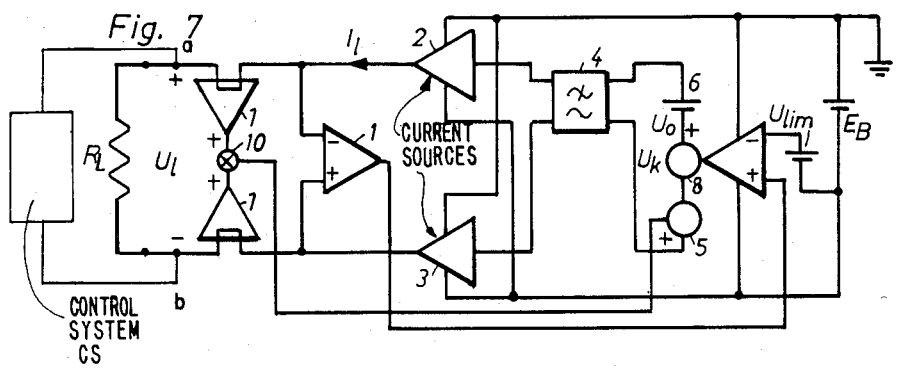
FIG. 7 illustrates an embodiment of the invention.

An implementation of the inventive idea for the dual system according to FIG. 5 is illustrated in FIG. 7. In this case the comparator 8 has a voltage output and adds a voltage to the inputs of the amplifiers 2,3. When $U_1 > E_B - U_{lim}$ with the same denotations as previously, the comparator output voltage $U_k$ is $$U_k = k(U_1 E_B + U_{lim})$$

otherwise $U_k = 0$ $U_1$ may then be written $$U_1 = A_v(U_o - I_1 - R_t - k(U_1 - E_B + U_{lim}))$$

Figure 8:
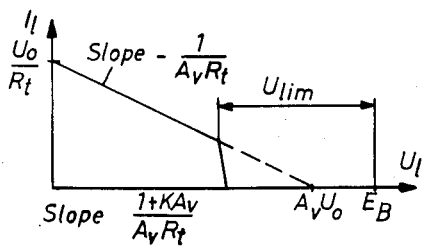
FIG. 8 illustrates the current-voltage characteristic for the circuit according to FIG. 7.

This relationship is illustrated graphically in FIG. 8. In this case also, the characteristic has a deflection point, the position of which follows the instant battery voltage $E_b$ at the distance $U_{lim}$, and this relationship gives the advantages mentioned above.

By putting a lowpass filter 4 between the inputs of the amplifiers 2,3 and the outputs from the current- and voltage sources, respectively, which control the output magnitude from these amplifiers, the line circuit from the terminal side is made independent, seen from the signal aspect, of the characteristic being given a deflection point in accordance with the inventive idea.

We claim:

1. A telephone exchange system apparatus for supplying current to a subscriber telephone set connected via a two-wire line to first and second terminals of the telephone exchange, said apparatus comprising: first and second analog current amplifier means each having a first input, each also having an output connected to one of said terminals for emitting signals, and each further having voltage supply input means; voltage supply means with an output voltage $E_B$ connected to each of said voltage supply input means; means for maintaining the output of said first current amplifier means at a constant potential; and control means connected to said first inputs of each of said current amplifier means for controlling the output current amplitudes thereof.

2. The apparatus of claim 1 further comprising lowpass filter means for connecting said control means to said first inputs of each of said current amplifier means.

3. The apparatus of claim 1 wherein said control means comprises three signal sources whose output signals are added to provide a control signal, one of said signal sources including means for generating a reference signal of fixed amplitude, another of said signal sources including means for generating a signal related to the amplitude of the signals emitted by said current amplifier means, and the third of said signal sources including means for generating a signal related to the voltage difference across said terminals.

4. The apparatus of claim 3 further comprising low-pass filter means for connecting said control means to said first inputs of each of said current amplifier means.

5. The apparatus of claim 4 wherein said third signal source comprises a difference amplifier means having inputs connected across said terminals.

6. The apparatus of claim 1 wherein said control means includes means for generating a signal which represents the sum of the potential difference across said terminals and the amplitude of the signals emitted by said current amplifier means.

* * * * *